United States Patent
Erhard et al.

(10) Patent No.: US 9,308,832 B2
(45) Date of Patent: Apr. 12, 2016

(54) METHOD FOR OPERATING RAILBOUND VEHICLES

(75) Inventors: Karl-Heinz Erhard, Braunschweig (DE); Jens-Harro Oechsner, Denkte ot Neindorf (DE); York Schmidtke, Wolfenbuettel (DE); Bernd Tieftrunk, Braunschweig (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 14/114,841

(22) PCT Filed: Apr. 23, 2012

(86) PCT No.: PCT/EP2012/057356
§ 371 (c)(1),
(2), (4) Date: Oct. 30, 2013

(87) PCT Pub. No.: WO2012/150143
PCT Pub. Date: Nov. 8, 2012

(65) Prior Publication Data
US 2014/0081488 A1 Mar. 20, 2014

(30) Foreign Application Priority Data
May 4, 2011 (DE) .................. 10 2011 075 218

(51) Int. Cl.
| B60L 15/32 | (2006.01) |
| B60L 15/42 | (2006.01) |
| B61L 3/00 | (2006.01) |
| B61L 15/00 | (2006.01) |
| B61L 23/34 | (2006.01) |
| B61L 27/00 | (2006.01) |
| B60L 15/40 | (2006.01) |
| B60M 3/06 | (2006.01) |

(52) U.S. Cl.
CPC ................ B60L 15/32 (2013.01); B60L 15/40 (2013.01); B60L 15/42 (2013.01); B61L 3/006 (2013.01); B61L 15/0027 (2013.01); B61L 23/34 (2013.01); B61L 27/0027 (2013.01); B60L 2200/26 (2013.01); B60M 3/06 (2013.01)

(58) Field of Classification Search
None
See application file for complete search history.

(56) References Cited

U.S. PATENT DOCUMENTS 6,980,894 B1 * 12/2005 Gordon et al. ............... 701/20
8,140,203 B2    3/2012 Noffsinger et al.

(Continued)

FOREIGN PATENT DOCUMENTS

| CN | 101554879 A | 10/2009 | |
| DE | 19654960 A1 * | 7/1998 | ............. B61L 27/00 |

(Continued)

OTHER PUBLICATIONS

NPL ref "U": Computers in Railways IX, T. Albrecht, Reducing power peaks and energy consumption in rail transit systems by simultaneous train running time control, 2004.*

*Primary Examiner* — Redhwan K Mawari
*Assistant Examiner* — Edward Torchinsky
(74) *Attorney, Agent, or Firm* — Laurence Greenberg; Werner Stemer; Ralph Locher

(57) ABSTRACT

A method for operating railbound vehicles includes transmitting driving information, between a first railbound vehicle and a second railbound vehicle, relating to the future driving operation of at least one of the two railbound vehicles, and coordinating the future driving operation of the two railbound vehicles on the basis of that driving information transmitted therebetween, in such a manner that braking energy fed back by the first railbound vehicle during a braking operation can be used at least partially by the second railbound vehicle.

9 Claims, 1 Drawing Sheet

(56) References Cited

U.S. PATENT DOCUMENTS

2010/0174484 A1* 7/2010 Sivasubramaniam et al. ............... 701/213
2014/0081488 A1* 3/2014 Erhard et al. ................ 701/20
2014/0180510 A1* 6/2014 Fournier et al. ............. 701/20

FOREIGN PATENT DOCUMENTS

| DE | 19822803 A1 | 11/1999 |
| DE | 102005042218 A1 | 3/2007 |
| DE | 102008003872 A1 | 8/2009 |
| EP | 0958987 B1 | 4/2006 |

* cited by examiner

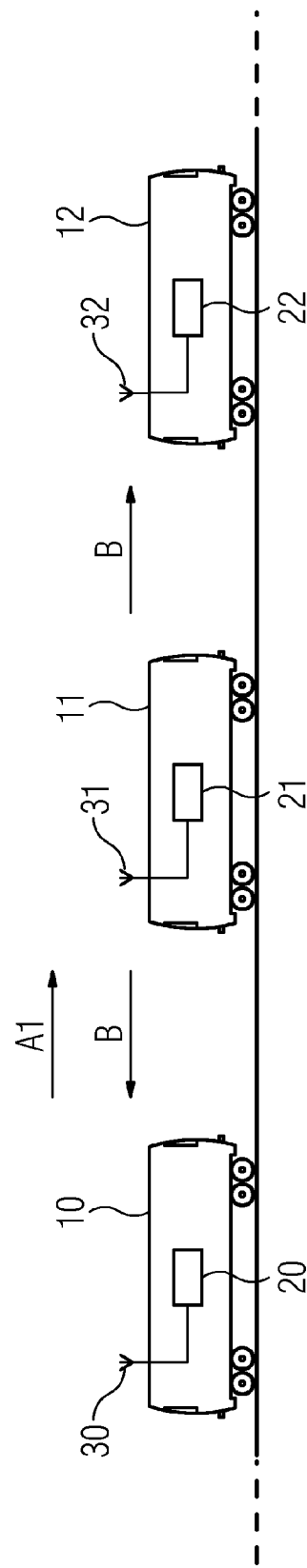

METHOD FOR OPERATING RAILBOUND VEHICLES

BACKGROUND OF THE INVENTION

Field of the Invention

During a braking operation of a railbound vehicle, which may, for example, be a rail vehicle or a track-guided vehicle with rubber tires, the kinetic energy of the railbound vehicles must be discharged by means of a braking system or several braking systems.

While traditionally conversion of kinetic energy into heat took center stage in this connection, in particular against the background of a reduction in the energy consumption of railbound vehicles enabled by this, wear-free deceleration systems in the form of the regenerative or electrodynamic brake have become increasingly important. In this connection, the power or the electrical energy generated during the braking operation is fed back into the respective contact line, i.e. for example an overhead cable or a conductor rail. In particular, in the case of a supply network in the form of a direct current network, for efficient energy recovery as a rule it is necessary for the electrical energy fed back into the network by a railbound vehicle to be absorbed by another railbound vehicle essentially simultaneously—for example, during an acceleration phase. For this reason, in practice great importance is attached to the coordination of the future driving operation of various railbound vehicles for the efficient use of the braking energy fed back by a railbound vehicle during a braking operation.

BRIEF SUMMARY OF THE INVENTION

The object of the present invention is to specify a method for operating railbound vehicles which enables at least partial use of the braking energy fed back by a railbound vehicle during a braking operation by another railbound vehicle and is comparatively easy to realize and particularly efficient in the process.

This object is achieved according to the invention by a method for operating railbound vehicles, wherein between a first railbound vehicle and a second railbound vehicle, driving information relating to the future driving operation of at least one of the two railbound vehicles is transmitted, and on the basis of said driving information transmitted between the two railbound vehicles, the future driving operation thereof is coordinated in such a manner that the braking energy fed back by the first railbound vehicle during a braking operation can be used at least partially by the second railbound vehicle.

The method according to the invention is characterized in that in a first method step driving information is transmitted between the first railbound vehicle and the second railbound vehicle. In the process the driving information relating to the driving operation of at least one of the two railbound vehicles can be transmitted both by means of unidirectional transmission by one of the two railbound vehicles to the other railbound vehicle as well as by means of bidirectional data exchange between the two railbound vehicles.

On the basis of the driving information transmitted between them, in a second method step it is advantageously possible for the two railbound vehicles to coordinate their future driving operation in such a manner that the braking energy fed back by the first railbound vehicle during a braking operation can be used at least partially by the second railbound vehicle. This means that the transmitted driving information is used so that at least one of the two railbound vehicles adjusts its future driving operation so that the braking energy fed back by the first railbound vehicle during the braking operation can be used at least partially by the second railbound vehicle. Taking into account the respective framework conditions which, for example, may be provided by a timetable and/or the respective route signaling, optimization preferably takes place to the effect that the second railbound vehicle can make maximum use of the braking energy fed back.

The method according to the invention offers the advantage that it enables a reduction in the overall energy consumption of a system with several railbound vehicles. A reduction in the greenhouse gases and energy costs resulting from the operation of the railbound vehicles for the respective transport operator is directly associated herewith. Furthermore, the method according to the invention is advantageous in particular in that decentralized coordination of the driving operation of the railbound vehicles by the railbound vehicles themselves or corresponding on-board control devices of the railbound vehicles takes place. Unlike a conceivable alternative method in which central coordination of the driving operation of the railbound vehicles takes place, for instance by means of a central control device in the form of a control center, increased availability results from this. The method according to the invention is therefore also applicable in addition if individual railbound vehicles or parts thereof fail, as by this means an impairment of the overall system is avoided in that for railbound vehicles which are still functional, coordination or synchronization of the driving operation to make efficient use of the braking energy fed back is still possible. Advantageously, furthermore no additional track-side infrastructure is necessary for the realization of the method according to the invention, resulting in costs and expenses in this regard being saved.

In accordance with a particularly preferred development, the method according to the invention is designed in such a manner that the future driving operation of the two railbound vehicles is coordinated so that a driving curve, on the basis of which the driving operation of the second railbound vehicle takes place, is determined or altered by the second railbound vehicle, taking account of the transmitted driving information. This is advantageous as by adjusting the driving curve of the second railbound vehicle, i.e. of the vehicle which at least partially is to absorb or absorbs the braking energy fed back by the first railbound vehicle during the braking operation, maximum use of the braking energy fed back can be achieved.

Preferably the method according to the invention can continue to be executed such that the future driving operation of the two railbound vehicles is coordinated in such a manner that the second railbound vehicle can determine or alter a time for its startup time point taking account of the transmitted driving information. This is advantageous as an adjustment of the driving curve of the second railbound vehicle is possible in a comparatively easy manner by determining or altering the startup time point, taking into account a pending braking operation of the first railbound vehicle in the event that the second railbound vehicle, for example, is essentially ready to leave at a stop or a station. By this means, the pending acceleration operation of the second railbound vehicle can thus be synchronized with the pending braking operation of the first railbound vehicle as far as possible to enable the second railbound vehicle to make the fullest use possible of the braking energy fed back by the first railbound vehicle.

In accordance with another particularly preferred embodiment of the method according to the invention, the future driving operation of the two railbound vehicles is coordinated in such a manner that a driving curve, on the basis of which the driving operation of the first railbound vehicle takes place, is determined or altered by the first railbound vehicle taking account of the transmitted driving information. In the process, a corresponding alteration of the driving curve of the first railbound vehicle may take place in addition or as an alternative to the aforementioned alteration of the driving curve of the second railbound vehicle. The alteration of the driving curve of the first railbound vehicle aims to chronologically synchronize the braking operation necessary, for example, on account of a stop ahead in the direction of travel or for safety reasons, as far as possible with the energy consumption of the second railbound vehicle which, for example, may be caused by a scheduled acceleration operation.

Preferably the method according to the invention can also be embodied in such a manner that a time slot for its startup is ascertained by the second railbound vehicle and with the driving information an indication of the time slot ascertained for the startup is transmitted by the second railbound vehicle to the first railbound vehicle. By this means it is advantageously made possible, for example, during transmission of the driving information for the first railbound vehicle to transmit a message to the second railbound vehicle in the event that it emerges from the driving curve of the first railbound vehicle that a predicted driving curve of the first railbound vehicle and the time slot for the startup of the second railbound vehicle form an intersecting set. Based on this, coordination of the future driving operation of the two railbound vehicles is then possible in such a manner that the braking energy fed back by the first railbound vehicle during the braking operation can be used to the maximum extent possible by the second railbound vehicle.

In addition or as an alternative to the aforementioned preferred development, the method according to the invention can also be designed advantageously in such a manner that a time slot for a braking operation is ascertained by the first railbound vehicle and with the driving information an indication of the time slot ascertained for the braking operation of the first railbound vehicle is transmitted by the first railbound vehicle to the second railbound vehicle. In this case the second railbound vehicle is therefore put in a position, based on the transmitted indication of the time slot ascertained for the braking operation of the first railbound vehicle, to coordinate the future driving operation of the two railbound vehicles in order to optimize the use of the energy fed back.

In principle, the transmission of the driving information between the two railbound vehicles can take place in any manner known per se. This includes, for example, transmission via a contact wire or rails.

In accordance with another particularly preferred embodiment of the method according to the invention, transmission of the driving information between the two railbound vehicles is radio-based. This is advantageous as railbound vehicles are often already fitted with transmission devices for the radio-based transmission of data and furthermore, corresponding transmission is comparatively robust and reliable.

Advantageously, in addition the method according to the invention can also be designed in such a manner that the driving information is transmitted between the two railbound vehicles at least partially by means of broadcasting. A broadcast here means a form of message or signal transmission in which undirected signal transmission takes place from the respective transmitter, not specifying the respective receiver. According to this preferred development of the method according to the invention, it is not necessary for all the messages transmitted during the transmission of the driving information to be transmitted for each broadcast; instead, for example, it is sufficient for a first message transmitted between the first and the second railbound vehicle to be transmitted for each broadcast, while any subsequent messages may clearly specify the respective receiver. At least partial transmission of the driving information between the two railbound vehicles for each broadcast is advantageous because as a rule the railbound vehicles will at least initially have no knowledge of the other railbound vehicles which are in their geographical proximity and might be worth considering for coordination of the driving operation in order to optimize the use of braking energy which is fed back. Due to the fact that during transmission of the driving information, for example, at least a first transmitted message is transmitted per broadcast, communication between different railbound vehicles is therefore made possible even without knowing an address of the receiver of the message.

Preferably the method according to the invention can also be developed in such a manner that at least one additional railbound vehicle is included in the transmission of the driving information and in the coordination of the future driving operation. This means that, for example, three or more railbound vehicles can also transmit driving information to each other and coordinate their future driving operation. Depending on the number of railbound vehicles taken into consideration and the respective circumstances, a reliable and sufficiently fast coordination process between the railbound vehicles concerned can be guaranteed, if necessary using suitable algorithms. The aim of coordination is to ensure the best possible use of braking energy fed back during braking operations. Thus, for example, it is conceivable that acceleration operations of the second railbound vehicle and another railbound vehicle are coordinated chronologically in such a manner that the braking energy fed back by the first railbound vehicle during the braking operation is first used by the second railbound vehicle and then by the other railbound vehicle. Alternatively, for example, it is also possible that between the first railbound vehicle, the second railbound vehicle and another vehicle for which a braking operation is pending, coordination or synchronization takes place in such a manner that first the braking energy fed back from the first railbound vehicle and then either wholly or partially simultaneously as well the braking energy of the other railbound vehicle can be used by the second railbound vehicle.

BRIEF DESCRIPTION OF THE SEVERAL VIEWS OF THE DRAWING

In the following the invention is explained in more detail on the basis of an exemplary embodiment, whereby the FIGURE shows an arrangement with three railbound vehicles to explain an exemplary embodiment of a method according to the invention.

DESCRIPTION OF THE INVENTION

In the FIGURE railbound vehicles 10, 11 and 12 can be identified, which may, for example, be rail vehicles in the form of light rail networks, subways or other local trains. The railbound vehicles 10, 11, 12 each have an onboard control device 20, 21 or 22, to each of which an onboard transmission device 30, 31 or 32 is connected. Radio-based communication between the onboard control devices 20, 21, 22 is possible by means of the onboard transmission devices 30, 31 or 32; furthermore, in addition the onboard transmission devices 30, 31 or 32 may if necessary also be used for radio-based communication of the onboard control devices 20, 21, 22 or the railbound vehicles 11, 12, 13 with track-side components, for example, in the form of a control center or a signal box.

It is assumed that components identified as ATO (Automatic Train Operation) are available or realized on the onboard control devices 20, 21, 22 to control the respective railbound vehicles 10, 11 or 12. Traditionally, the corresponding components operate self-sufficiently or independently of each other on the respective railbound vehicle 10, 11 or 12 by calculating an energy-optimized driving curve to the next danger spot on the basis of the timetable status, the topological information and the vehicle properties. Coordination between the individual onboard control devices 20, 21, 22 or the respective ATOs is not envisaged in this connection, however.

Within the framework of the aforementioned exemplary embodiment of the method according to the invention, the railbound vehicles 10, 11 and 12 are now operated in such a manner that the driving information concerning the future driving operation of at least one of the railbound vehicles 10 and 11 is transmitted between a first railbound vehicle in the form of the railbound vehicle 10 and a second railbound vehicle in the form of the railbound vehicle 11. This means that communication takes place between the onboard control devices 20, 21 by means of onboard transmission devices 30, 31 connected to the respective onboard control devices 20, 21. By this means, during the determination of the driving curve of the railbound vehicles 10, 11 it is made advantageously possible to undertake higher-level coordination between the railbound vehicles 10, 11 where appropriate to enable the effects of energy feedback to be maximized. To this end, the driving information is transmitted between the railbound vehicles 10 and 11 and then the future driving operation of the two railbound vehicles 10 and 11 is coordinated on the basis of the driving information transmitted between them in such a manner that the braking energy fed back by the first railbound vehicle 10 during a braking operation can be used at least partially by the second railbound vehicle 11.

The transmission of the driving information, i.e. the transmission of information between the onboard control devices 20, 21 of the railbound vehicles 10, 11 or the associated ATOs may, for example, take place in such a way that the second railbound vehicle 11 is assumed to be ready for departure at a stop, a potential departure time slot, i.e. a time slot for a startup, is ascertained, and with the driving information an indication of the time slot ascertained for the startup is transmitted by the second railbound vehicle 11 to the first railbound vehicle 10. Within the framework of the aforementioned exemplary embodiment, transmission of the information about the time slot ascertained for the startup takes place by means of a broadcast message B which, triggered by the onboard control device 21 of the railbound vehicle 11, is transmitted by the onboard transmission device 31. By means of the broadcast message or the broadcast signal B, the onboard control device 21 or the associated ATO of the railbound vehicle 11 therefore asks railbound vehicles in close proximity whether their predicted braking curves form an intersecting set with the time slot ascertained for the startup in the selected time slot.

Within the framework of the aforementioned exemplary embodiment it is assumed that this is the case with regard to the first railbound vehicle 10 so that during transmission or exchange of the driving information by the first railbound vehicle 10, an answer signal A is transmitted to the second railbound vehicle 11 by means of the onboard transmission device 30.

On the basis of the driving information transmitted between them by means of the messages or signals B and A, it is possible for both the railbound vehicles 10 and 11 to coordinate their future driving operation in such a manner that the energy fed back by the first railbound vehicle 10 during a braking operation can be used at least partially by the second railbound vehicle 11. Ultimately the aim is to enable the best possible use of the braking energy of the first railbound vehicle 10 by the second railbound vehicle 11 which is starting up, taking into consideration the respective framework conditions that must be observed. For this purpose the driving curve, on the basis of which the driving operation of the respective railbound vehicle 10 or 11 takes place, is determined or altered by the first railbound vehicle 10 and/or by the second railbound vehicle 11, taking into consideration the transmitted driving information. This may, for example, take place by the onboard control device 21 of the railbound vehicle ready for departure 11 within a search space or time slot, which may for example be 10 s, optimizing the startup or departure time of the railbound vehicle 11 in such a manner that maximum use can be made of the energy fed back by the first railbound vehicle 10. Depending on the respective specific implementation, it may possibly be expedient for the first railbound vehicle 10 to save a list of those railbound vehicles which have undertaken a reservation of braking energy of the first railbound vehicle during the transmission of the driving information. This makes it possible—insofar as this is necessary in individual cases depending on the respective implementation or embodiment—to avoid fed-back energy being assigned more than once.

In the FIGURE it is discernible that the broadcast signal B is received not only by the first railbound vehicle 10 but also by another railbound vehicle 12 in addition. As a braking operation is not pending for this railbound vehicle 12 in the time slot interrogated by the railbound vehicle 11, the additional railbound vehicle 12 does not return an answer signal A to the railbound vehicle 11 upon receipt of the broadcast signal B. Alternatively, it would however also be conceivable that in the event of a pending braking operation the additional railbound vehicle 12 is also included in the coordination of the driving operation and the best possible coordination or synchronization therefore takes place with regard to the use of fed-back energy in relation to the overall system of the three railbound vehicles 10, 11 and 12. Alternatively, in addition the use of braking energy of the first railbound vehicle 10 by the additional railbound vehicle 12 might be possible on account of a pending acceleration operation and be realizable by means of corresponding coordination between the railbound vehicles 10, 11 and 12.

It should be noted that the transmission of the driving information between the railbound vehicles 10, 11 and 12 or their onboard control devices 20, 21 or 22 can of course also take place in another manner. Thus, for example, it is also conceivable that the transmission of the driving information is initiated by the first railbound vehicle 10. Furthermore, the bidirectional transmission of driving information is not necessarily required; instead, for example, it is also possible that only the first railbound vehicle 10 reports the period of time of its envisaged braking operation to the second railbound vehicle 11 by means of transmission of the driving information and the second railbound vehicle 11 hereupon coordinates its driving curve in the best possible manner. In general, corresponding coordination can take place both by changing the driving curve of the first railbound vehicle 10, changing the driving curve of the second railbound vehicle 11 or also by changing the driving curves of both the railbound vehicles 10 and 11.

In accordance with the aforementioned exemplary embodiment, the method according to the invention is characterized in that it is possible to maximize the effects of energy feedback by means of a decentralized approach. The method is advantageously independent of central control devices and as a result of this is particularly robust and can at the same time be realized with comparatively little effort.

The invention claimed is:

1. A method for operating railbound vehicles, the method comprising the following steps:
   transmitting driving information between a first railbound vehicle and a second railbound vehicle not connected to the first railbound vehicle, the driving information relating to future driving operation of at least one of the first and second railbound vehicles; and
   coordinating the future driving operation of the first and second railbound vehicles based on the driving information transmitted between the first and second railbound vehicles, to permit braking energy fed back by the first railbound vehicle during a braking operation to be used at least partially by the second railbound vehicle.

2. The method according to claim 1, which further comprises carrying out the step of coordinating the future driving operation of the first and second railbound vehicles by causing the second railbound vehicle to determine or alter a driving curve, based on which the driving operation of the second railbound vehicle takes place, while taking the transmitted driving information into consideration.

3. The method according to claim 1, which further comprises carrying out the step of coordinating the future driving operation of the first and second railbound vehicles by causing the second railbound vehicle to determine or alter a time for its startup, while taking the transmitted driving information into consideration.

4. The method according to claim 1, which further comprises carrying out the step of coordinating the future driving operation of the first and second railbound vehicles by causing the first railbound vehicle to determine or alter a driving curve, based on which the driving operation of the first railbound vehicle takes place, while taking the transmitted driving information into consideration.

5. The method according to claim 1, which further comprises:
   ascertaining a time slot for a startup of the second railbound vehicle; and
   transmitting an indication of the time slot ascertained for the startup from the second railbound vehicle to the first railbound vehicle while using the driving information.

6. The method according to claim 1, which further comprises:
   ascertaining a time slot for a braking operation of the first railbound vehicle; and
   transmitting an indication of the time slot ascertained for the braking operation of the first railbound vehicle from the first railbound vehicle to the second railbound vehicle while using the driving information.

7. The method according to claim 1, wherein the transmission of the driving information between the first and second railbound vehicles is radio-based.

8. The method according to claim 1, which further comprises transmitting the driving information between the first and second railbound vehicles at least partially by broadcasting.

9. The method according to claim 1, which further comprises involving at least one additional railbound vehicle in the transmission of the driving information and in the coordination of the future driving operation.

* * * * *